US012590571B2

(12) United States Patent
Jayaraman et al.

(10) Patent No.: US 12,590,571 B2
(45) Date of Patent: Mar. 31, 2026

(54) BEARING FOR A WIND TURBINE, METHOD FOR MONITORING AN ANOMALY IN A BEARING OF A WIND TURBINE, SYSTEM FOR MONITORING AN ANOMALY IN A BEARING OF A WIND TURBINE AND WIND TURBINE

(71) Applicant: Nordex Energy SE & Co. KG, Hamburg (DE)

(72) Inventors: Sriram Jayaraman, Chennai (IN); Arumugam Muthaiyan, Chennai (IN)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 18/938,042

(22) Filed: Nov. 5, 2024

(65) Prior Publication Data

US 2025/0198394 A1 Jun. 19, 2025

(30) Foreign Application Priority Data

Dec. 18, 2023 (EP) ...................................... 23217539

(51) Int. Cl.
*F03D 80/70* (2016.01)
*F03D 7/04* (2006.01)
*F16C 19/52* (2006.01)

(52) U.S. Cl.
CPC .............. *F03D 80/70* (2016.05); *F03D 7/042* (2013.01); *F16C 19/522* (2013.01); *F16C 2360/31* (2013.01)

(58) Field of Classification Search
CPC ...... F03D 17/00; F03D 17/0065; F03D 80/70; F16C 2233/00; F16C 2360/31; F16C 19/52; F16C 41/00
See application file for complete search history.

(56) References Cited

U.S. PATENT DOCUMENTS

| | | | |
|---|---|---|---|
| 9,851,278 B2 | 12/2017 | van der Ham et al. | |
| 10,151,667 B2 * | 12/2018 | Hodac ..................... | G01D 5/353 |
| 11,709,106 B2 * | 7/2023 | Guo ......................... | F03D 80/70 416/1 |
| 2016/0123304 A1 | 5/2016 | Kibsgaard et al. | |
| 2020/0326251 A1 | 10/2020 | Guo et al. | |

FOREIGN PATENT DOCUMENTS

| | | | | |
|---|---|---|---|---|
| DE | 10 2011 085 415 A1 | 5/2013 | | |
| DE | 10 2022 202 934 A1 | 9/2023 | | |
| EP | 2 290 235 A2 | 3/2011 | | |
| EP | 3 004 635 A1 | 4/2016 | | |
| EP | 3 343 030 A1 | 7/2018 | | |
| EP | 3 722 628 A1 | 10/2020 | | |
| KR | 20180073019 A * | 7/2018 | .............. | F16C 35/04 |

OTHER PUBLICATIONS

European Search Report of the European Patent Office dated May 8, 2024 in application No. EP 23 21 7539 on which this application is based.

* cited by examiner

*Primary Examiner* — Justin D Seabe

(74) *Attorney, Agent, or Firm* — Walter Ottesen, P.A.

(57) ABSTRACT

A bearing for a wind turbine includes a first ring and a second ring. The first ring and the second ring are rotatably arranged relative to each other around a rotational axis. A reference element and a sensor element are applied to the first ring. The sensor is configured to detect a geometrical change of the reference element.

16 Claims, 6 Drawing Sheets

BEARING FOR A WIND TURBINE, METHOD FOR MONITORING AN ANOMALY IN A BEARING OF A WIND TURBINE, SYSTEM FOR MONITORING AN ANOMALY IN A BEARING OF A WIND TURBINE AND WIND TURBINE

CROSS-REFERENCE TO RELATED APPLICATIONS

This application claims priority of European patent application no. 23217539.8, filed Dec. 18, 2023, the entire content of which is incorporated herein by reference.

TECHNICAL FIELD

The present disclosure relates to a bearing for a wind turbine. Furthermore, the present disclosure relates to a method for monitoring an anomaly in a bearing of a wind turbine, to a system for monitoring an anomaly in a bearing of a wind turbine and to a wind turbine.

BACKGROUND

Wind turbines are widely known and are used to convert wind energy into mechanical power and subsequently, into electrical energy. Some components of the wind turbine, like bearings of the wind turbine, are subject to a variety of operating loads and extreme loads. The loads may include, but are not limited to axial loads, bending loads, torsional loads, radial loads, and circumferential loads, resulting in respective stresses. An anomaly, such as damage or a beyond-the-limit deformation in a bearing may lead to catastrophic failure of dynamic components, eventually resulting in breakdown of the wind turbine or to undesired events, such as complete shutdown of the wind turbine. This may lead to hazards, disruption of power production leading to losses, and so on.

SUMMARY

One object to be achieved is to provide a bearing which contributes to a lower risk of significant damage to the bearing, particularly by assessing certain characteristics of a bearing on a continuous basis. Further objects to be achieved are the provision of a method and a system for monitoring an anomaly in a bearing such that imminent damage to the bearing can be determined in a timely manner and significant damage can be avoided.

First, the bearing for a wind turbine is specified.

According to an embodiment, the bearing is for a wind turbine and includes a first ring and a second ring. The first ring and the second ring are rotatably arranged relative to each other around a rotational axis. A reference element and a sensor element are applied to the first ring. The sensor element is configured to detect a geometrical change of the reference element.

The present disclosure is, inter alia, based on the recognition that, with the sensor element being configured to detect a geometrical change of the reference element being applied to the first ring, it is possible to detect a geometrical change associated with the first ring. Such a geometrical change can be an indication of an anomaly/damage or imminent damage, like a crack or an irregular deformation.

The bearing may be a roller bearing or a sliding bearing, for example. Particularly, the bearing may be a bearing of a pitch system or of a yaw system of the wind turbine.

The first ring and the second ring are, for example, arranged concentrically to each other and concentrically around a central axis which is the common central axis of both the rings. The common central axis is, in particular, the rotational axis. The rotational axis is the axis about which one of the rings rotates relative to the other. For example, during operation, the first ring is kept in position and the second ring is rotating or vice versa.

In an embodiment, the rotating first ring is attached to a movable component, for example, a rotor blade (pitch system) or a nacelle (yaw system) of the wind turbine, and the stationary second ring is attached to a support structure, for example, to a hub (pitch system) or a tower (yaw system). This arrangement ensures smooth, controlled angular movements of the movable components relative to the support structures.

The sensor element and the reference element are applied to the first ring, for example, fixed to the first ring. The sensor element is, for example, a complete sensor which is configured to provide a measurement signal which can be evaluated.

The sensor element is configured to detect a geometrical change of the reference element. This geometrical change may be a displacement or a deformation. For example, the sensor element is configured to detect a displacement of a portion of the reference element relative to the sensor element, or alternately, a deformation, like a stretching or a compression, of the reference element. The geometrical change is, for example, a geometrical change in circumferential direction, like a displacement in circumferential direction or a deformation in the circumferential direction.

The circumferential direction is herein defined as a direction around the rotational axis, for example, along a circumference of the first ring. It can also be referred to as "azimuthal direction" or "rotational direction". A radial direction is defined as a direction through the rotational axis and perpendicular to the rotational axis and the circumferential direction.

According to a further embodiment, the reference element is an elongated element extending in circumferential direction at least partially around the rotational axis. A first portion of the reference element is fixed to the first ring and a second portion of the reference element which is spaced apart from the first portion, in particular, spaced apart in the circumferential direction, is arranged movably relative to the first ring. In an embodiment, the reference element is wound or wrapped such that the first portion and the second portion are spaced apart such that they circumferentially overextend relative to each other. The sensor element is fixed to the first ring. A circumferential displacement of the second portion of the reference element relative to the sensor element is measurable by using the sensor element, that is, with the help of the sensor element.

For example, the reference element extends over an angular range of at least 90° or at least 180° or at least 270° or at least 360° around the rotational axis. In an embodiment, the reference element is wrapped around over an angular range that is greater than 360°. That is, the reference element may completely surround the rotational axis in circumferential direction. In other embodiments, the extension of the reference element may be over an angular range of less than 90 degrees. When the sensor element and the first portion of the reference element are fixed to the first ring, and the second portion moves relative to the sensor element, this can be an indication that a geometrical feature, of the first ring in circumferential direction, that is, along the circumference, has changed. This change can be, for example, an extension or stretching of the first ring in the circumferential direction. Such a change can be an indication of onset of a crack in the first ring or that a crack has further expanded.

For instance, the first portion is one longitudinal end of the reference element. The second portion may be the other longitudinal end of the reference element. A clamp or any other fixing means may be used to fix the first portion of the reference element and the sensor element to the first ring. The clamp(s) may be screwed or adhered to the first ring.

The second portion, according to an embodiment, may be freely supported to exhibit displacement along the circumferential direction relative to the fixed first portion and the fixed sensor element.

According to a further embodiment, a fixture including a restraint and a spring is present. One end of the spring is fixed to the restraint and the other end of the spring is fixed to the second portion of the reference element. Moreover, the restraint is fixed to the first ring. The spring facilitates or enables a relative movement between the restraint and the second portion of the reference element, particularly in circumferential direction.

The reference element may be tensioned in the circumferential direction, for example with the help of the spring. For example, the restraint is screwed or adhered to the first ring. The tensioning of the reference element may assist in efficient measurement of displacement of the second end relative to the sensor when the first ring undergoes a geometrical change explained previously.

According to a further embodiment, the reference element is wound around the rotational axis and the second portion of the reference element projects beyond the first portion of the reference element in the circumferential direction. In other words, the reference element extends by more than 360° around the rotational axis. In this way, it can be guaranteed that a crack or a defect or a beyond-the-limit deformation at any location of the first ring will be detected.

According to a further embodiment, the reference element is non-deformable in the circumferential direction. The reference element may be non-stretchable and/or non-compressible in circumferential direction.

According to a further embodiment, the reference element is an elongated element extending in circumferential direction at least partially around the rotational axis. The reference element is deformable in circumferential direction and the sensor element is configured to detect a deformation of the reference element, particularly in the circumferential direction.

In order to deform when an anomaly appears in the first ring, the reference element may be fixed to the first ring. For example, at least a first portion and a second portion of the reference element are fixed to the first ring. The first portion is, for example, circumferentially spaced apart from the second portion. The first and the second portion may be the two longitudinal ends of the reference element. As mentioned before, the reference may be wound around the rotational axis so that the second portion projects beyond the first portion in circumferential direction. The reference element could also be fixed to the first ring in a region between the first and the second portion, for example, it could be fixed to the first ring over its entire length.

The reference element may, for example, be elastically deformable, for example, stretchable up to the elastic limit. For instance, the reference element is reversibly deformable.

In order to measure the deformation of the reference element, the sensor element could be realized as a strain sensor or a deflection sensor, for example, a strain gauge or as an optical strain sensor.

According to a further embodiment, the sensor element is at least one of: attached to the reference element and embedded into the reference element. For example, if the sensor element is a strain gauge, it could be attached to the reference element. If the sensor element is an optical strain sensor, the sensor element could be embedded into the reference element.

According to a further embodiment, the reference element is one of a cable, a rope, a hose, a wire, a strand, a strip, and a fiber. The reference element may be formed of any synthetic and naturally available materials, such as plastic, elastomers like rubbers, or metal. For example, the reference element is formed in one piece.

According to a further embodiment, the first ring is one of an outer ring of the bearing and an inner ring of the bearing. Accordingly, the second ring is the other one of the outer ring of the bearing or the inner ring of the bearing. The outer ring surrounds the inner ring, that is, the outer ring has a greater diameter.

According to a further embodiment, the reference element is supported by at least one support, for example, two or three or four or more supports. The at least one support may be fixed to the first ring. The at least one support is, for example, arranged such that it supports and holds the reference element at the first ring but enables a movement or a deformation of the reference element relative to the support, particularly in circumferential direction. Several supports may be arranged at different locations around the rotational axis, for example, equally distributed in circumferential direction.

The at least one support can be realized as a guide for the reference element, such as a cable guide in case of a cable type reference element. For example, the at least one support includes a groove or a notch in the first ring. The groove or notch may extend in circumferential direction and may accommodate the reference element. The groove or the notch may be lined with a frictionless coating to assist easy movement or deformation of the reference element.

The at least one support could also include a plurality of rollers attached to the first ring. The rollers could be arranged in the groove or notch, or directly attached to the circumferential surface of the bearing ring in the absence of a notch or a groove.

Further possibilities are that the at least one support includes a hose, or a sleeve or a strip which may be glued/fixed to the first ring.

Yet another possibility is that the at least one support includes two or several clamps fixed to the first ring. Each clamp may include a slot to allow passing of the reference element, for example, a rope or a cable, so that the reference element remains wound or wrapped around the first ring of the bearing.

According to a further embodiment, the sensor element is a position sensor, a motion sensor, a proximity sensor, or a limit switch selected from one or more of an optical sensor, an electrical sensor, an electro-mechanical sensor, a magnetic sensor, an electro-magnetic radiation-based sensor, or an acoustic sensor.

The measuring set-up including the sensor element and the reference element and optional other elements, like the fixture and/or the support and/or the fixing means, may be provided as a standalone-product which can then be attached to the bearing.

Next, the method for monitoring an anomaly in a bearing of a wind turbine is specified.

According to an embodiment, the method for monitoring an anomaly in a bearing of a wind turbine that uses the bearing according to any of the embodiments is described herein. The method includes a step of providing first information which is representative of a geometrical change of the reference element and the first information is determined depending on the geometrical change detected by the sensor element. The method includes a further step of determining second information depending on the first information, wherein the second information is representative of whether the geometrical change exceeds a threshold. If this is the case, that is, if the second information is representative of the geometrical change exceeding the threshold, an output signal is generated. The output signal is indicative of at least one of an anomaly present in the bearing and a propagation of the anomaly.

Since the method uses the bearing according to any of the embodiments described herein, all features disclosed for the bearing are also disclosed for the method and vice versa.

The method is, in particular, a computer-implemented method, that is, executed by a computer or a processor. Herein, when information is represented for a certain quantity or certain quantities, this means that the quantity or quantities can be extracted or determined from the information. The first and the second information is, in particular, electronic information, like electronic data.

The first information can, for example, be determined depending on the measurements provided by the sensor element. For this purpose, a control unit or a processor, on which the method is performed, may be communicatively coupled to the sensor element.

For determining the second information, the geometrical change of the second information is compared to a threshold. The threshold may be a predetermined threshold. The threshold may be variable or may be fixed.

The value(s) corresponding to the threshold may be pre-stored in a memory associated with the control unit or the processor. The values may be derived from historical data generated from the bearing behavior in response to onset or propagation of the anomaly.

In other embodiments, the values corresponding to the thresholds may be set (automatically or manually) using a look-up table, a manual furnished by the equipment manufacturer, et cetera.

An output signal is generated when the detected geometrical change exceeds the threshold. The output signal is indicative of an anomaly, for example a crack or an excessively high extension, in the bearing. Additionally, or alternatively, the output signal can be indicative of an anomaly in the bearing propagating, for example, a crack becoming larger. The output signal is, in particular, an electrical signal, for example, a digital or an analog signal.

According to a further embodiment, the method further includes a step of providing third information which is representative of an operating condition associated with the wind turbine. The second information is also determined depending on the third information by setting the threshold depending on the operating condition. Thus, the threshold is determined depending on the operating condition. That is, the threshold is variable or dynamic in nature. For example, the threshold is increased or decreased depending on the operating condition. The third information may be determined by measurements or simulations.

According to a further embodiment, the operating condition is at least one of a temperature, a rotational speed of the bearing, a pretension applied to the first ring, a force acting on the bearing, a stress induced in the first ring and a pitch angle. By way of example, if a value of one of these operating conditions increases, the threshold also increases.

A temperature sensor, for example, an onboard temperature sensor of the wind turbine may be used for determining the temperature. In case of bearings such as a rotor shaft bearing, the temperature sensor may be applied directly to the bearing or in the vicinity of the bearing. The pretension, the force and the stress values may be extracted from drive control modules which operate drives in order to cause a relative rotation between the first ring and the second ring and/or separate sensor modules, for example, onboard sensors. The pitch angle may be measured with the help of an incremental encoder or determined by any of the known means.

According to a further embodiment, the output signal is configured to cause a generation of a noticeable warning signal. Additionally, or alternatively, the output signal is configured to cause a change of an operating parameter associated with the operation of the wind turbine. Additionally, or alternatively, the output signal is configured to cause an emergency shutdown of the wind turbine.

By way of example, the output signal is representative of how much the geometrical change exceeds the threshold. The more the deviation from the threshold that is, exceeded, the more aggressive the measure which is caused by the output signal may be. For example, a small excess (for example, indicative of an increase of the circumference of the first ring of at most 2 millimeters) relative to the threshold causes a generation of the warning signal, like an optical/acoustic warning signal. A larger excess (for example, indicative of an increase of the circumference of the first ring between 2 millimeters and 5 millimeters) relative to the threshold causes the change of an operating parameter, for example, pitch angle, associated with the operation of the wind turbine, optionally together with the generation of a noticeable warning signal. An even higher excess (for example, indicative of an increase of the circumference of the first ring by more than 5 millimeters) relative to the threshold may initiate an emergency shutdown sequence.

The operating parameter could be at least one of: a pitch angle setpoint, a nacelle position setpoint, a generator power setpoint, a rotor speed setpoint.

Next, the system for monitoring an anomaly in a bearing of a wind turbine is specified.

According to an embodiment, the system for monitoring an anomaly in a bearing of a wind turbine in which the bearing includes a first ring and a second ring being rotatably arranged relative to each other around a rotational axis is disclosed. The system includes a reference element and a sensor element which are both applied to the first ring. The sensor element is configured to detect a geometrical change of the reference element. The system further includes a control unit which is communicatively coupled to the sensor element. The control unit is configured to provide first information which is representative of the geometrical change of the reference element, wherein the first information is determined depending on the geometrical change detected by the sensor element.

The control unit may be an auxiliary control unit to the main controller (also called "turbine controller" which may be a programmable logic controller [PLC]) of the wind turbine. Alternatively, the control unit is the turbine controller.

According to a further embodiment, the control unit is further configured to determine second information depending on the first information, wherein the second information is representative of whether the geometrical change exceeds a threshold. The control unit may also be configured to generate an output signal if the second information is representative of the geometrical change to exceed the threshold. The output signal is indicative of at least one of an anomaly present in the bearing and a propagation of the anomaly in the bearing.

If the control unit is an auxiliary unit which is different from the turbine controller, the steps of determining the second information and/or the output signal may alternatively be executed by the turbine controller. For this purpose, the auxiliary control unit would then be communicatively coupled to the turbine controller.

Next, the wind turbine is specified. The wind turbine includes the system according to any of the embodiments described herein.

BRIEF DESCRIPTION OF DRAWINGS

The invention will now be described with reference to the drawings wherein.

DETAILED DESCRIPTION

Figure 1:
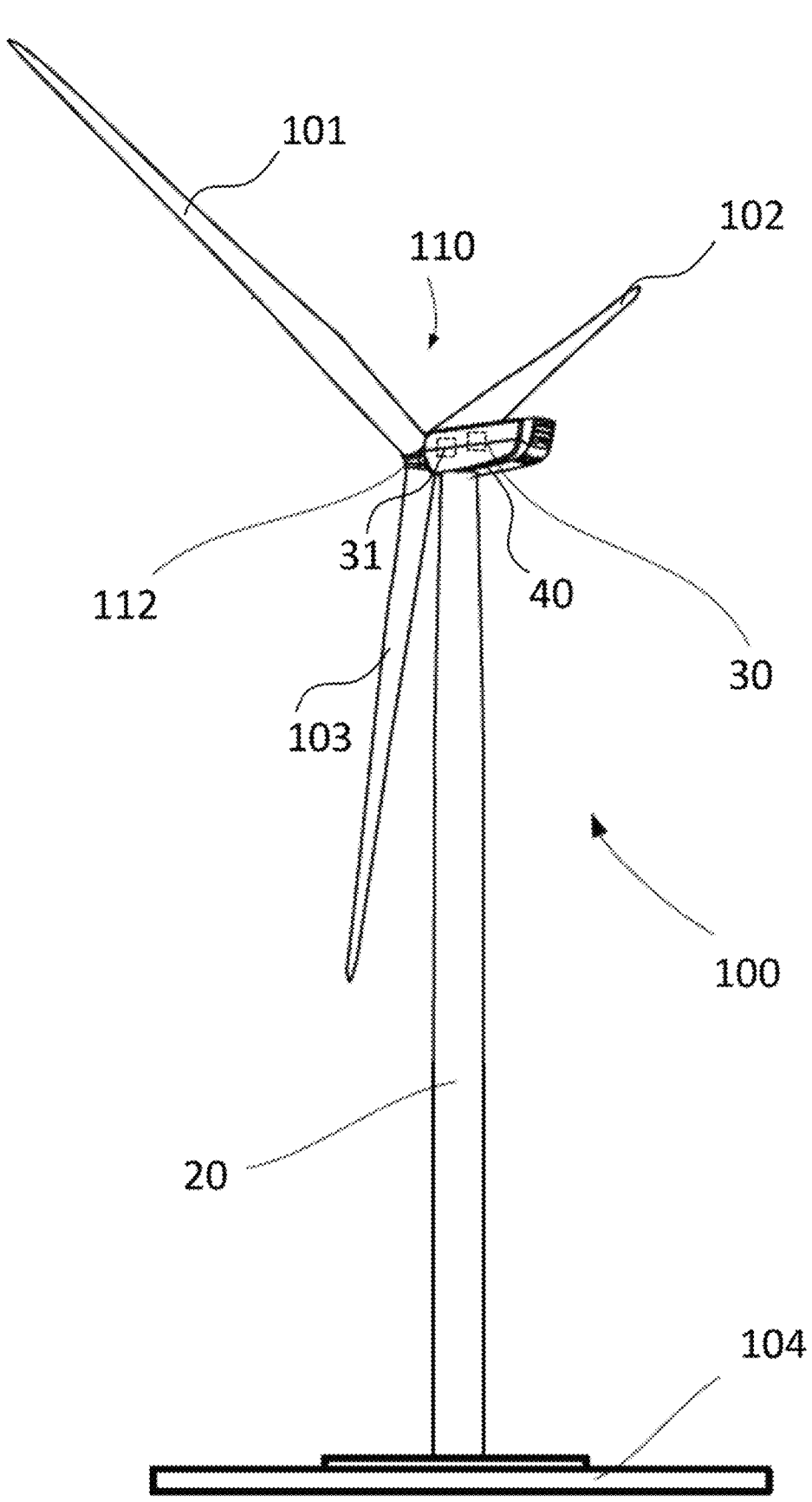
FIG. 1 shows an embodiment of a wind turbine including an embodiment of the system.

FIG. 1 shows a wind turbine 100 which includes a tower 20. The tower 20 is fixed to the ground via a foundation 104. At one end of the tower 20, opposite to the ground, a nacelle 40 is rotatably mounted. The nacelle 40 includes, for example, a generator (not shown) which is coupled to a rotor 110 via a gearbox (not shown). The rotor 110 includes three (wind turbine) rotor blades 101, 102, 103, which are arranged on a rotor hub 112, the rotor hub 112 being connected to a rotor shaft (not shown).

During operation, the rotor 110 is set in rotation by an air flow, for example wind interacting with the blades 101, 102, 103 resulting in forces acting on the blades 101, 102, 103. This rotational movement is transmitted to the generator via the drive train including, inter alia, the rotor shaft and the gearbox. The generator converts the mechanical energy of the rotor 110 into electrical energy.

The nacelle 40 has to be rotated into the wind to optimize the energy output of the wind turbine 100. This is attained through the yaw system (not shown). Moreover, the pitch angles of the rotor blades 101, 102, 103 have to be adjusted according to the wind speed and other conditions to optimize the performance of the rotor and to keep the energy yield of the turbine at desired levels. The adjustment of blade angles is known as pitching and is taken care of by the pitch system. Present day turbines have dedicated pitch controls to adjust the pitch angles. The adjustment is done with the help of drives (not shown) which rotate the rotor blades 101, 102, 103 about their respective axes relative to the hub. This is known as pitch actuation. In case of yaw actuation, separate drives are employed to rotate the nacelle 40 about the axis of the tower 20 to respective positions. Both these rotations are enabled by respective bearings (not shown). In order to control and operate the drives, the wind turbine includes a main controller 30 (turbine controller) which, for example, determines operating setpoints with which the drives are operated. The main controller 30 is located in the nacelle 40. Furthermore, an auxiliary control unit 31 is arranged in the nacelle 40 which is communicatively coupled with the main controller 30. The purpose of this auxiliary control unit 31 will be explained later.

Figure 2:
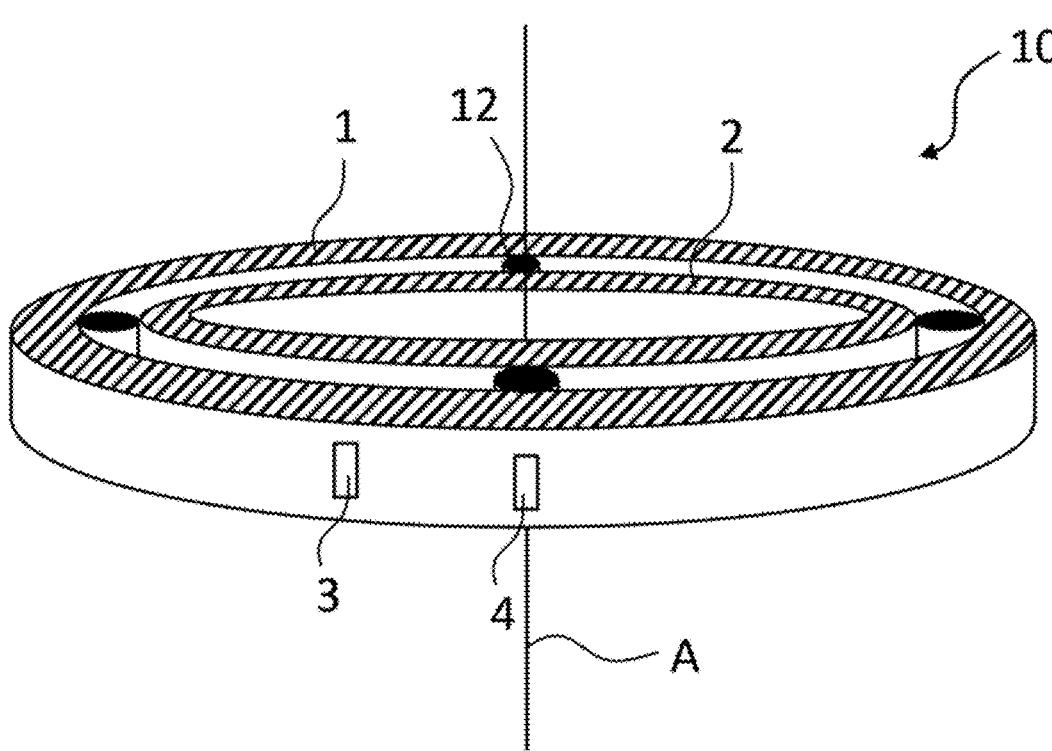
FIGS. 2 to 9 show different embodiments of the bearing.

FIG. 2 shows a first embodiment of the bearing 10. This bearing 10 may be used in order to enable the rotation of the rotor blades 101, 102, 103 or the rotation of the nacelle 40 as mentioned before.

The bearing 10 includes a first ring 1 and a second ring 2 which are rotatably arranged relative to each other around a rotational axis A. The first ring 1 and the second ring 2 are concentrically arranged around the rotational axis A. Rolling elements 12 are arranged between the first ring 1 and the second ring 2 in order to enable the relative rotation. Although only four of these rolling elements 12 are shown in FIG. 2, it is clear that any number of rolling elements 12 may be used. Further, the drives engage with one of the bearing rings 1, 2 to move or actuate the ring 1, 2 to cause pitch or yaw motion, as described above.

A reference element 3 and a sensor element 4 are applied to the first ring 1 which, in the present embodiment, constitutes an outer ring of the bearing 10. The sensor element 4 is configured to detect a geometrical change of the reference element 3. In principle, such a geometrical change may be a displacement of a portion of the reference element 3 relative to the sensor element 4 or a displacement of the whole reference element 3 relative to the sensor element 4 or a deformation of the reference element 3.

In the case of FIG. 2, the geometrical change is, for example, a displacement of the reference element 3 relative to the sensor element 4 in circumferential direction or substantially circumferential direction. The circumferential direction is a direction around the rotational axis A.

When an anomaly such as, but not limited to a defect occurs in the first ring 1, the first ring undergoes a change in geometrical characteristics, for example, a strain where the shape and size of first ring 1 changes. In response to the change(s), the reference element 3 undergoes a geometrical change, for example, a displacement away from the sensor element 4 in the circumferential direction as described above.

Referring again to FIG. 2, in other embodiments, the reference element 3 and the sensor element 4 may be arranged such that a geometrical change in other directions, for example, along the height/depth of first ring 1 parallel to the central axis A, or along the thickness of the first ring 1 in the radial direction (perpendicular to the central axis A) may be measured and monitored.

In some embodiments, the sensor element 4 could be a position sensor, a motion sensor, a proximity sensor, a limit switch, or a deformation sensor which may be selected from one or more classes of sensors, such as an optical sensor, an electrical sensor, an electro-mechanical sensor, a magnetic sensor, an electro-magnetic radiation-based sensor, or an acoustic sensor. The reference element 3 could be an element which can inherently assist in detection/measurement of physical quantities. For example, it can be made of a material which allows displacement to be optically or acoustically detected, for example, via reflection.

In other embodiments, the reference element 3 may be attached or equipped with auxiliary attachments or elements to assist in detection/measurement of physical quantities, for example, displacement, as explained earlier. The examples include, but are not limited to an electro-magnetic radiation sensitive element, an inductive element or a magnetic element that may be attached to the reference element 3 to conduct measurements and monitoring using the sensor element 4.

Figure 3:
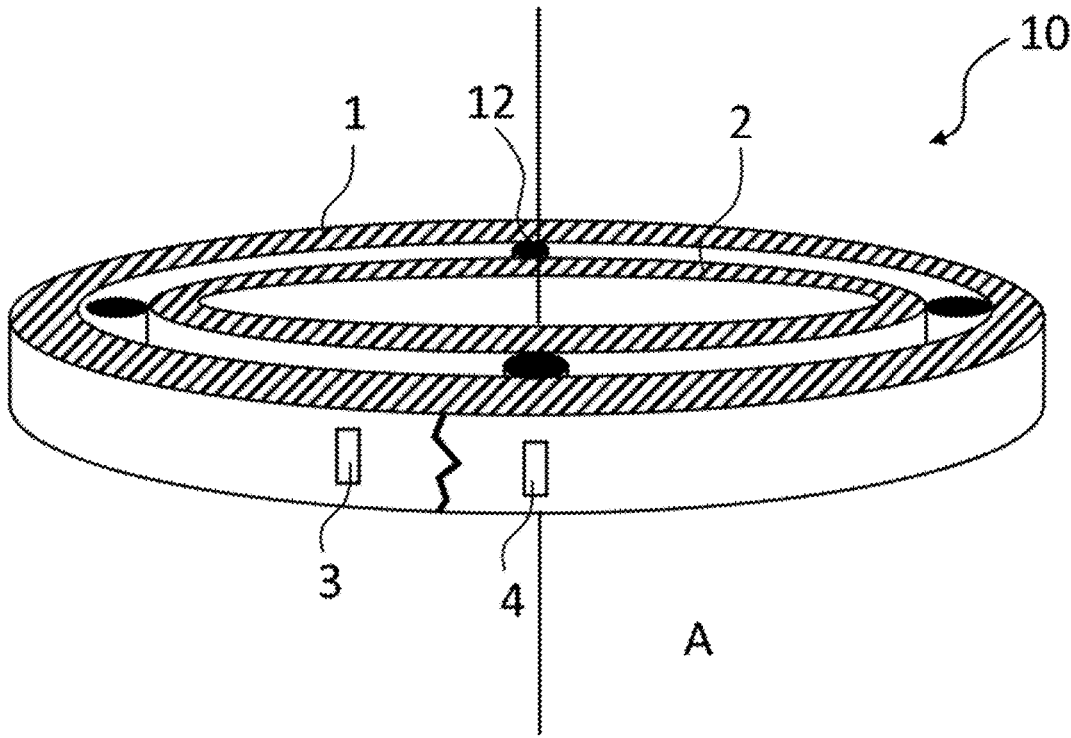

FIG. 3 shows the bearing 10 of FIG. 2 with an anomaly in the form of a crack that has formed in the first ring 1 of the bearing 10 in a localized region between the reference element 3 and the sensor element 4. This crack induces a displacement of the reference element 3 relative to the sensor element 4 in circumferential direction, which is detectable by the sensor element 4. Crack formation and propagation can either be on the circumferential surface of the first ring 1 or on the radial surface perpendicular to the central axis A.

One or more of such reference element 3-sensor element 4 pairs may be applied at different surfaces of the first ring 1. For example, one reference element 3-sensor element 4 pair may be applied on the circumferential surface, and a second reference element 3-sensor element 4 pair may be applied on the radial surface depending on configuration and assembly feasibility of the bearing 10. The reference element 3-sensor element 4 pair may also be applied to monitor propagation of a crack after a crack has been identified, for example, during a routine check or maintenance procedures. Such a crack may be present on the circumferential surface or the radial surface such that the reference element 3-sensor element 4 pair may be applied on either side of the detected crack for further monitoring.

Figure 4:
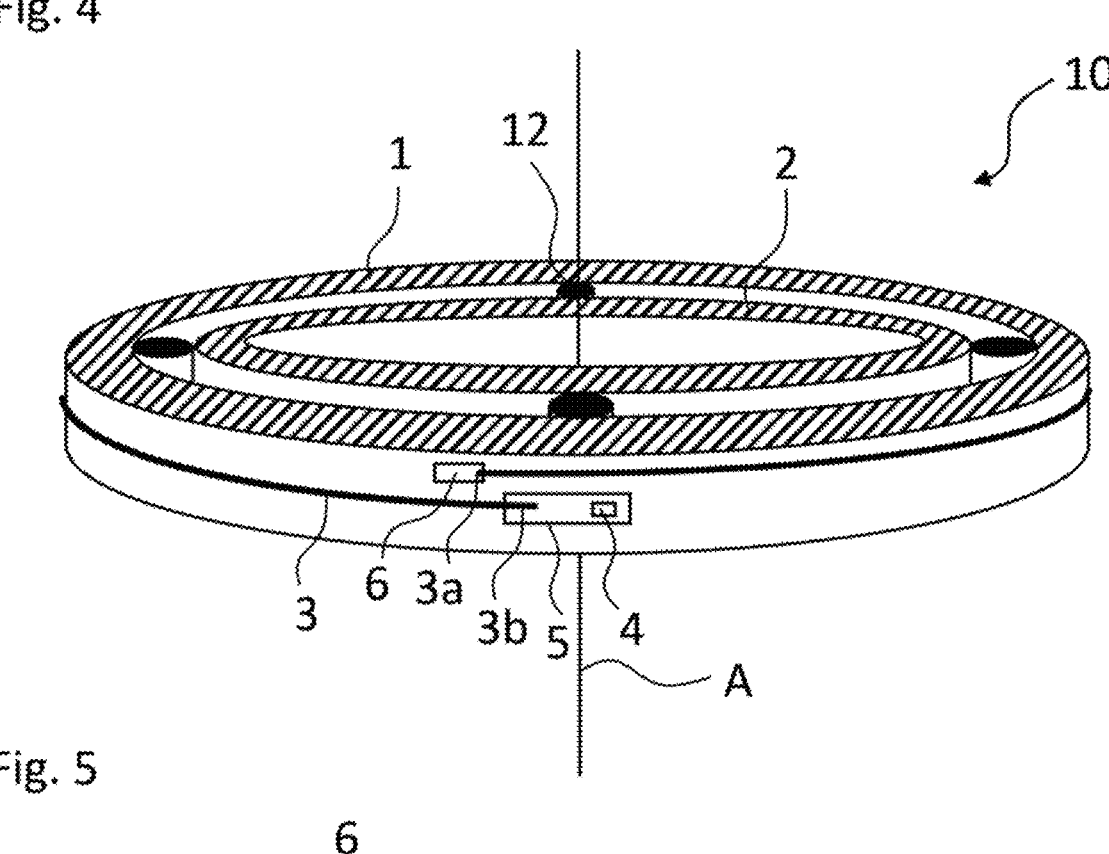

FIG. 4 shows a further embodiment of the bearing 10. In this case, the reference element 3 is an elongated element extending in circumferential direction completely around the rotational axis A. Particularly, the reference element 3 is, for example, a cable or a wire or a rope which is, for example, non-stretchable or inextensible. The non-stretchable or inextensible property of the reference element 3 may facilitate the reference element 3 to undergo displacement in response to geometrical changes experienced by the first ring 1 due to an anomaly, like a crack. In an embodiment, the elongated reference element 3 may be tensioned.

In an embodiment, the elongated reference element 3 may be applied on a particular position on the first ring 1 where the reference element 3 may be particularly sensitive to an anomaly such as a crack, and less sensitive or negligibly sensitive to other external factors, for example, thermal expansion or contraction.

As depicted in FIG. 4, a first portion 3*a* of the reference element 3, namely a longitudinal end thereof, may be fixed to the first ring 1 via a clamp or any other means. A second portion 3*b* of the reference element 3, namely the other longitudinal end thereof, is arranged movable relative to the first ring 1 in circumferential direction. A sensor element 4 is fixed to the first ring 1 and observes the second portion 3*b*.

Figure 5:
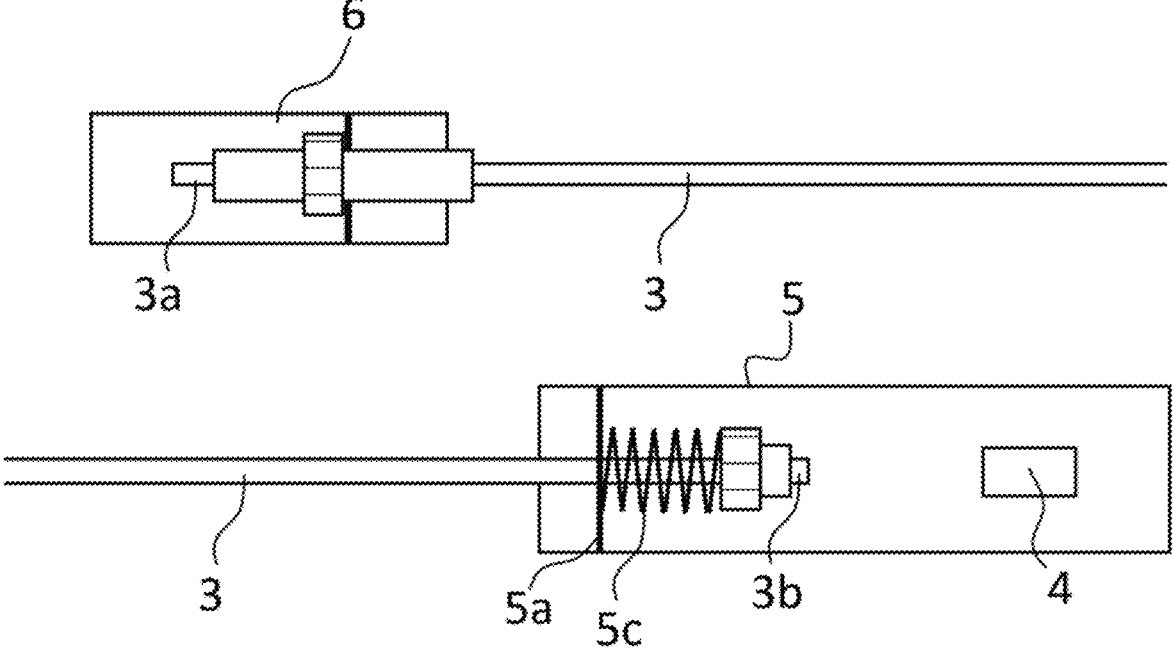

FIG. 5 illustrates in greater detail how the fixed arrangement of the first portion 3*a* and the movable arrangement of the second portion 3*b* are realized. As already mentioned, the first portion 3*a* is fixed to the first ring 1 via a clamp 6. The second portion 3*b* of the reference element 3 is supported at the first ring 1 via a fixture 5. The fixture 5 is fixed to the first ring 1 and includes a restraint 5*a* and a spring 5*c*. One longitudinal end of the spring 5*c* is fixed to the restraint 5*a* and the other longitudinal end of the spring 5*c* is fixed to the second portion 3*b* of the reference element 3. Thus, a relative movement of the second portion 3*b* of the reference element 3 relative to the first ring 1 is enabled by the spring 5*c*. In other words, the second portion 3*b* of the reference element 3 is spring-loaded against the restraint 5*a* such that the second portion 3*b* may return to an original position under restoring force of the spring 5*c* when a load on the reference element 3 is removed.

In an embodiment, the second portion 3*b* may be accompanied by a flange, a washer, a nut or any other element to apply compressive force on the spring 5*c* when the second portion 3*b* undergoes displacement away from the sensor 4.

The spring 5*c* may thereby also be used to tension the reference element 3 in circumferential direction. For example, the reference element 3 is only fixed to the first ring 1 at the first portion 3*a*, but nowhere else along the longitudinal portion of the reference element 3.

The sensor element 4 may be spaced apart from the second portion 3*b* of the reference element 3 and is configured to detect a change of the circumferential distance between the second portion 3*b* and the sensor element 4. For example, the sensor element 4 is a position sensor, like an optical position sensor, or a limit switch. Taking the example of an optical sensor, for example, laser-based sensors, the second portion 3*b* may include or may be attached with an optical transmitter (or receiver) which optically interacts with the receiver (or transmitter) present or associated with the sensor element 4.

In other configurations, the sensor element 4 (or the reference element 3) may include both the transmitter and the receiver, such that the reference element 3 (or the sensor element 4) serves as a reflecting surface to facilitate measurements of optical features. Optical characteristic(s) in response to displacement of the second portion 3*b* relative to the sensor 4 can thus be measured and monitored.

In an embodiment, the orientation of the sensor element 4 may be adjusted appropriately to enhance transmission and/or reception of optical signals with respect to the second portion 3*b* along the arcuately shaped circumferential surface of the first ring 1. Appropriate deviations and tolerances may be considered during such scenarios.

Figure 6:
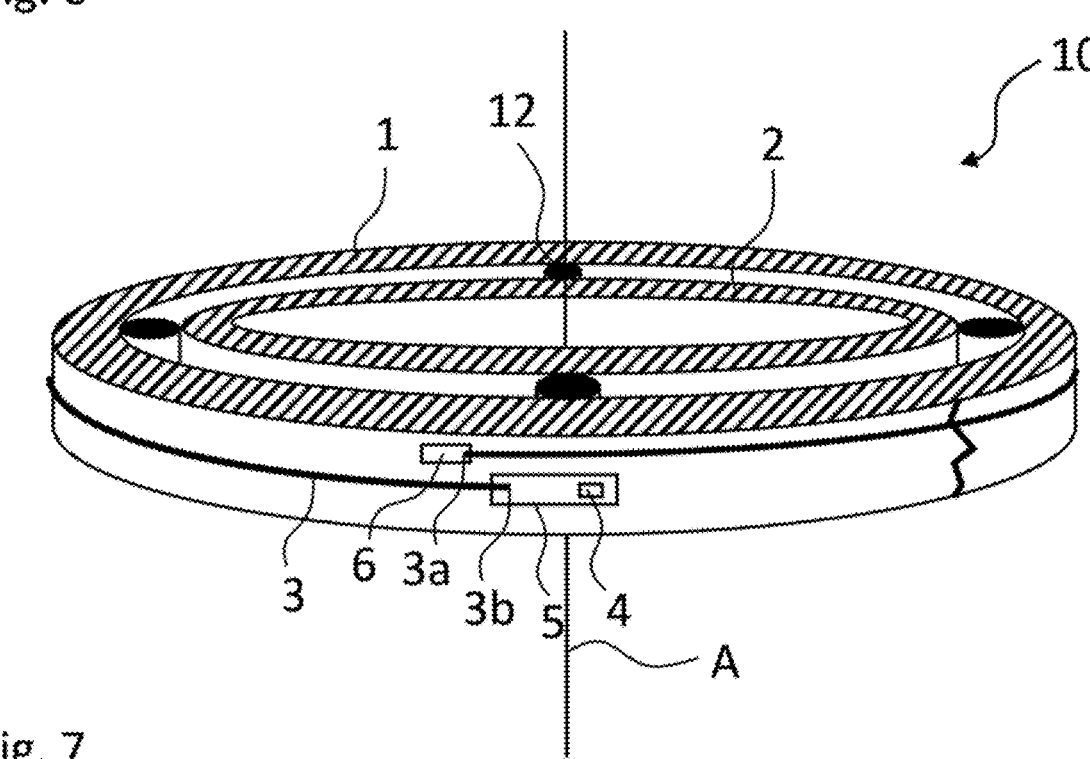
Figure 7:
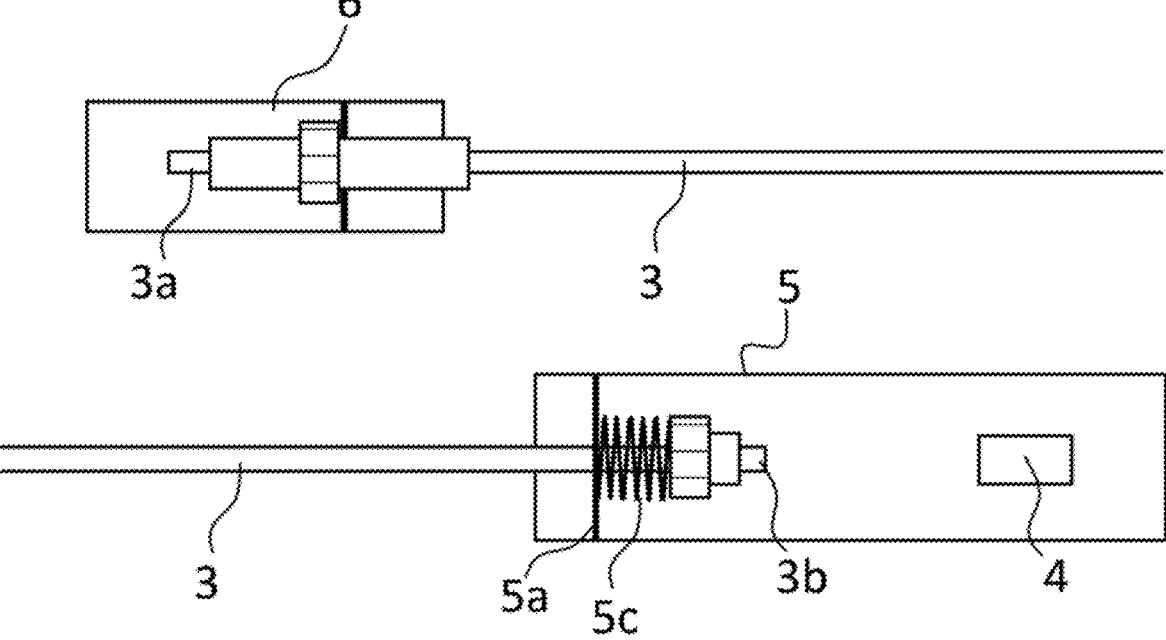

FIGS. 6 and 7 show the situation when a crack forms anywhere along the circumference of the first ring 1. Since the reference element 3 extends completely circumferentially around the rotational axis A, a crack at any position in the first ring 1 can be detected. Due to the crack, the circumference of the first ring 1 increases. Accordingly, the circumferential distance between the second portion 3*b* and the sensor element 4 increases, whereby the spring 5*c* is (further) compressed. The sensor element 4 detects this increase in the circumferential distance, from which it can be concluded that a crack has formed in the first ring 1. The fixation of the first portion 3*a* causes a pull of the freely supported second portion 3*b* (away from the sensor element 4) by compressing the spring 5*c*, resulting in the circumferential displacement of the second portion 3*b*.

As the crack propagates and continues to propagate, the circumferential distance further increases between the second portion 3*b* and the sensor element 4, and the sensor element 4 may detect the change in displacement in a transient (continuous) manner.

Figure 8:
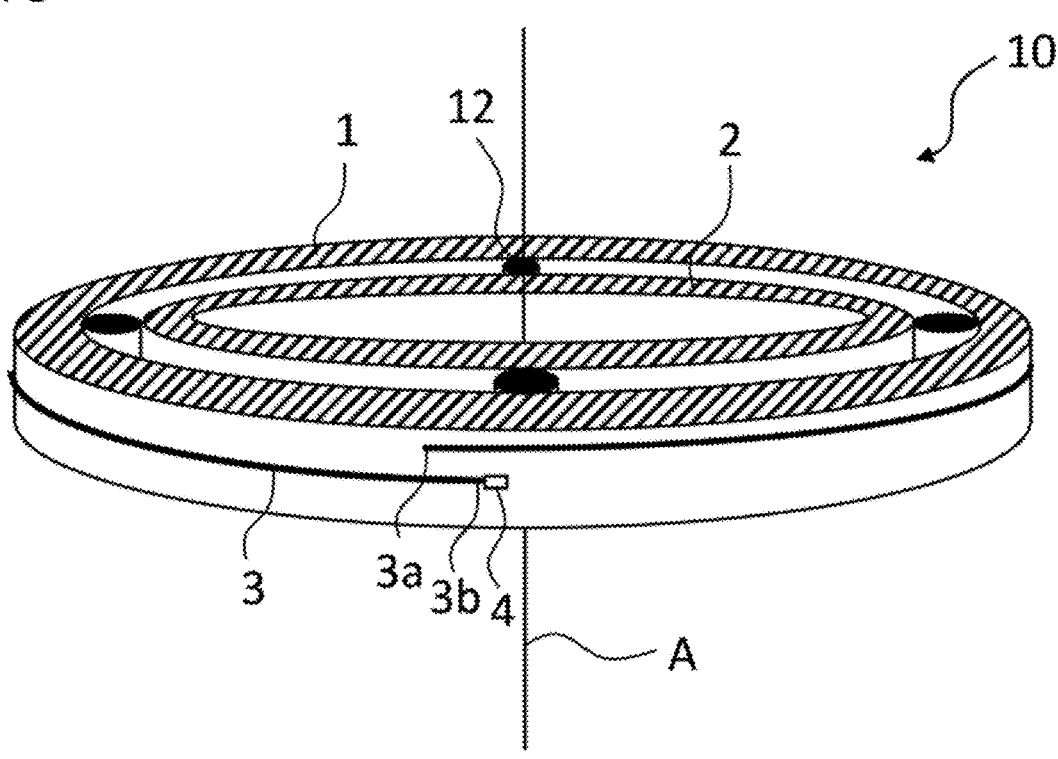

FIG. 8 shows a further embodiment of the bearing 10. Again, a reference element 3 and a sensor element 4 are attached to the first ring 1. In this case, the reference element 3 may be deformable, for example, a stretchable cable in which a strain sensor, for example, an optical fiber/strand type sensor may be embedded. The reference element 3 is, for example, fixed to the first ring 1 at both longitudinal ends 3*a*, 3*b* so that, when the circumference of the first ring 1 increases as a result of an anomaly, such as a crack, the reference element 3 is stretched.

The reference element may be an elastic cable, fiber, strand, wire, rope or a strip which may undergo elastic deformation [tensile and compressive] to a limited extent.

The reference element 3 explained here and in the previous embodiments may be held by one or more supports at one or more locations along the circumference of the first ring 1. The support, as explained previously, may be in the form of a groove or a notch which may partially or fully accommodate the elongated reference element 3. The groove or the notch may be layered with an anti-friction layer to assist in frictionless displacement or deformation of the reference element 3. Another possibility is that the groove or the notch may accommodate rollers or pulleys at different locations over which the reference element is wound or passed through. The pulleys or rollers may assist in the displacement or deformation of the reference element 3 in such cases.

In other embodiments, the support may be in the form of a roller/pulley affixed directly to the surface of the first ring 1, such that the displacement or deformation of the reference element 3 is assisted. In still other embodiments, the support may be a clamp, a bracket, or a guide positioned at different locations in the circumferential direction.

Taking the example of an optical sensor, the optical fiber may be a part of the sensor element 4. The sensor element 4 further includes a source and a detector arranged on the reference element 3. When the reference element 3 is stretched, a travelling path or other optical characteristics in the optical fiber changes which is detected by the detector.

Figure 9:
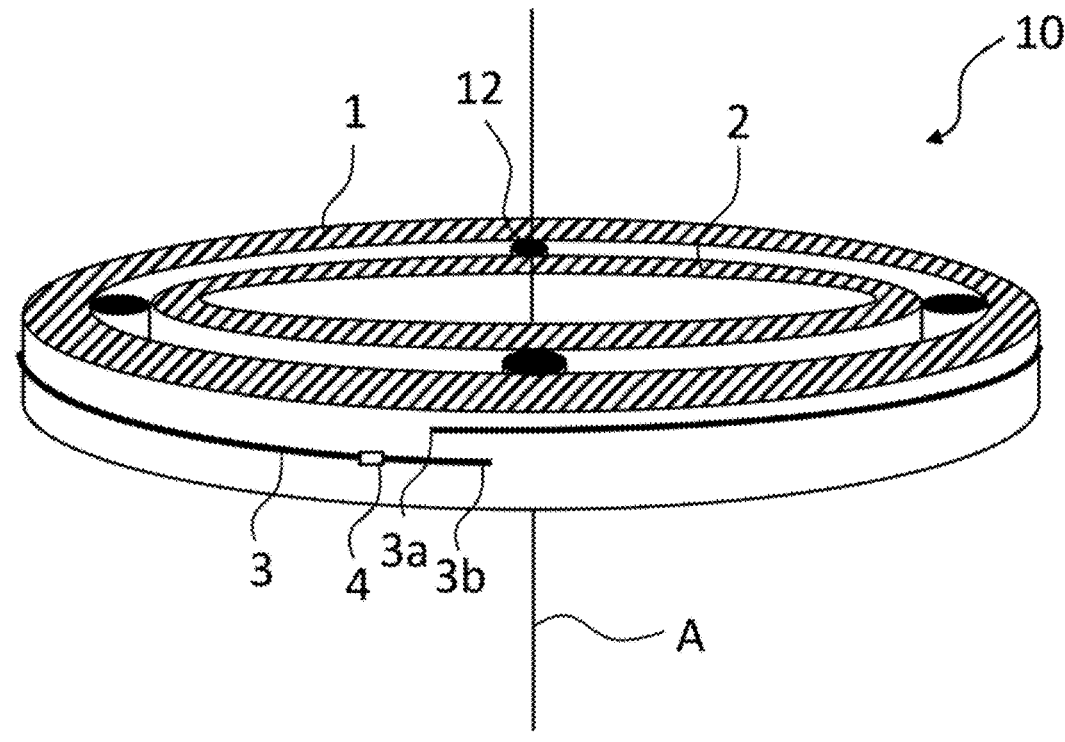

FIG. 9 shows an embodiment of the bearing 10, where the reference element 3 is formed in the same way as in FIG. 8. However, instead of an optical strain sensor as used in FIG. 8, the sensor element 4 is now realized as an electromechanical sensor in the form of a strain gauge. The sensor element 4 is attached, for example fixed, to the reference element 4 so that the stretching of the reference element 3 is detected by the sensor element 4 when it is stretched.

Figure 10:
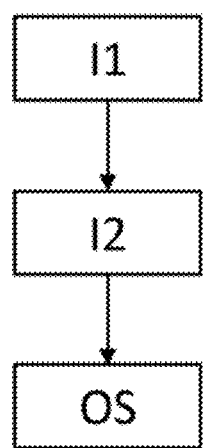
FIGS. 10 and 11 show flowcharts of different embodiments of the method.

FIG. 10 shows a flowchart of a first embodiment of the method for monitoring an anomaly, such as a crack, in a bearing of a wind turbine. This method could be performed with any of the bearings 10 described in connection with the FIGS. 2 to 9, for example. In one step, first information I1 is provided which is representative of a geometrical change of the reference element 3, wherein the first information I1 is determined depending on the geometrical change detected by the sensor element 4. Then, second information I2 is determined depending on the first information I1, wherein the second information I2 is representative of whether the geometrical change exceeds a threshold. If this is the case, an output signal OS is generated which is indicative of at least one of an anomaly present in the bearing and a propagation of the anomaly.

Figure 11:
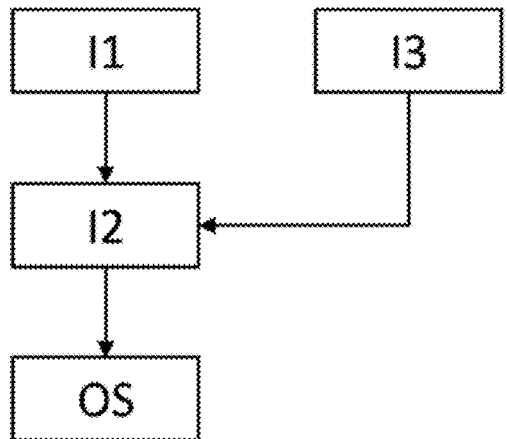

FIG. 11 shows a further embodiment of the method based on a flowchart. In addition to the first information I1, third information I3 is provided which is representative of an operating condition associated with the wind turbine 100. The second information I2 is then also determined depending on the third information I3 by setting the threshold depending on the operating condition. The operating condition may be at least one of the temperature, rotational speed of the bearing, pretension applied to the first ring, a force acting on the bearing, a stress induced in the first ring and a pitch angle of one of the rotor blades. All of these operating conditions may have an influence on the first ring 1. Therefore, it can be beneficial to take these operating conditions into consideration by adjusting the threshold according to the operating conditions. For example, the threshold may be increased at high temperatures, the threshold may be decreased with the decreasing set-pretension, and so on.

The output signal OS may be configured to cause the generation of a noticeable warning signal. Thus, when the output signal is received by a suitable device, a warning signal is generated by the device, for example, visual indications or safety alarms. Additionally, or alternatively, the warning signal is configured to cause a change of an operating parameter associated with the operation of the wind turbine, for example, modify the pitch angle of one or more blades so that the power output of the wind turbine or the rotational speed of the wind turbine is reduced or brought to zero. Additionally, or alternatively, the output signal may be configured to cause an emergency shutdown of the wind turbine 100 which again may be attained through pitching of the blades, for example, to feathering positions.

The first information I1 of FIGS. 10 and 11 may be provided by the auxiliary control unit 31 mentioned above. For example, the auxiliary control unit 31 is communicatively coupled to the sensor element 4. The measurement signals of the sensor element 4 can then be evaluated by the auxiliary control unit 31 which determines the geometrical change or the first information I1. In an embodiment, the auxiliary control unit 31 may be configured within the pitch system of the wind turbine. The auxiliary control unit 31 may be communicatively coupled to the main controller 30 (turbine controller) to which it can then provide the first information I1. The main controller 30 may then execute the steps of determining the second information I2 and the output signals OS.

Alternatively, the auxiliary control unit 31 may execute the steps of determining the second information I2 and the output signal OS.

It is understood that the foregoing description is that of the preferred embodiments of the invention and that various changes and modifications may be made thereto without departing from the spirit and scope of the invention as defined in the appended claims.

REFERENCE SIGN LIST

1 first ring
2 second ring
3 reference element
3*a* first portion
3*b* second portion
4 sensor element
5 fixture
5*a* restraint
5*c* spring
6 clamp
10 bearing
12 rolling elements
20 tower
30 main controller/turbine controller
31 auxiliary control unit
40 nacelle
100 wind turbine
101 first rotor blade
102 second rotor blade
103 third rotor blade
104 foundation
110 rotor
A rotational axis
I1 first information
I2 second information
I3 third information
OS output signal

The invention claimed is:

1. A bearing for a wind turbine, the bearing defining a rotational axis and comprising:

a first ring and a second ring rotatably arranged relative to each other about said rotational axis;

a reference element applied to said first ring;

a sensor applied to said first ring; and, said sensor being configured to detect a geometrical change of said reference element;

said reference element having a first portion fixed to said first ring and a second portion spaced apart from said first portion;

said second portion being arranged movably relative to said first ring; and, wherein said sensor is configured to measure a displacement of said second portion of said reference element relative to said sensor.

2. The bearing of claim 1, wherein:

said reference element is an elongated element extending in a circumferential direction at least partially around said rotational axis;

said sensor is fixed to said first ring; and, said displacement of said second portion relative to said sensor is a circumferential displacement of said second portion of said reference element relative to said sensor.

3. The bearing of claim 2, further comprising:

a fixture including a restraint and a spring having first and second ends;

one end of said spring being fixed to said restraint and the other end of said spring being fixed to said second portion of said reference element;

said restraint being fixed to said first ring; and, said spring facilitating a relative movement between said restraint and said second portion of said reference element.

4. The bearing of claim 2, wherein:

said reference element is wound around said rotational axis; and, said second portion of said reference element projects beyond said first portion of said reference element in the circumferential direction.

5. The bearing of claim 2, wherein said reference element is non-deformable in the circumferential direction.

6. The bearing of claim 1, wherein:

said reference element is an elongated element extending in a circumferential direction at least partially around the rotational axis;

said reference element is deformable in the circumferential direction;

said sensor is configured to detect a deformation of said reference element; and, said sensor is at least one of: i) attached to said reference element; and, ii) embedded into said reference element.

7. The bearing of claim 1, wherein the sensor is at least one of a position sensor, a motion sensor, a proximity sensor, and a limit switch selected from at least one of an optical sensor, an electrical sensor, an electro-mechanical sensor, a magnetic sensor, an electro-magnetic radiation-based sensor, and an acoustic sensor.

8. The bearing of claim 1, wherein the reference element is supported by at least one support.

9. A method for monitoring an anomaly in a bearing of a wind turbine, the bearing defining a rotational axis and including: a first ring and a second ring rotatably arranged relative to each other about said rotational axis; a reference element applied to said first ring, said reference element having a first portion fixed to said first ring and a second portion spaced apart from said first portion, said second portion being arranged movably relative to said first ring; a sensor applied to said first ring; and, said sensor being configured to detect a geometrical change of said reference element by measuring a displacement of said second portion relative to said sensor; the method comprising the steps of:

providing first information representative of the geometrical change of the reference element wherein the first information is determined in dependence upon the geometrical change detected by the sensor;

determining second information depending on the first information wherein the second information is representative of whether the geometrical change exceeds a threshold; and, when the geometrical change exceeds the threshold, then generating an output signal indicative of at least one of: an anomaly present in the bearing and a propagation of the anomaly.

10. The method of claim 9, further comprising the step of:

providing third information representative of an operating condition associated with the wind turbine; and, wherein the second information is also determined in dependence upon the third information by setting the threshold in dependence upon the operating condition.

11. The method of claim 10, wherein the operating condition is at least one of:

a temperature, a rotational speed of the bearing, a pretension applied to the first ring, a force acting on the bearing, a stress induced in the first ring, and a pitch angle.

12. The method of claim 9, wherein: the output signal is configured to cause one of: a generation of a noticeable warning signal, a change of an operating parameter associated with operation of the wind turbine, and an emergency shutdown of the wind turbine.

13. A system for monitoring an anomaly in a bearing of a wind turbine, the bearing including a first ring and a second ring being rotatably arranged relative to each other around a rotational axis, the system comprising:

a reference element applied to the first ring;

a sensor applied to said first ring;

the sensor being configured to detect a geometrical change of the reference element;

a control unit communicatively coupled to the sensor and configured to: provide first information representative of the geometrical change of the reference element; and, the first information being determined in dependence upon the geometrical change detected by the sensor;

said reference element having a first portion fixed to said first ring and a second portion spaced apart from said first portion;

said second portion being arranged movably relative to said first ring; and, wherein said sensor is configured to measure a displacement of said second portion of said reference element relative to said sensor.

14. The system of claim 13, wherein the control unit is further configured to:

determine second information in dependence upon the first information, wherein the second information is representative of whether the geometrical change exceeds a threshold, and, when the threshold is exceeded, then generate an output signal indicative of at least one of an anomaly present in the bearing and a propagation of the anomaly in the bearing.

15. A wind turbine comprising a system for monitoring an anomaly in a bearing of a wind turbine, the bearing including a first ring and a second ring being rotatably arranged relative to each other around a rotational axis, the system including:

a reference element applied to the first ring;

a sensor applied to said first ring;

the sensor being configured to detect a geometrical change of the reference element;

a control unit communicatively coupled to the sensor and configured to: provide first information representative of the geometrical change of the reference element; and, the first information being determined in dependence upon the geometrical change detected by the sensor;

said reference element having a first portion fixed to said first ring and a second portion spaced apart from said first portion;

said second portion being arranged movably relative to said first ring; and, wherein said sensor is configured to measure a displacement of said second portion of said reference element relative to said sensor.

16. The wind turbine of claim 15, wherein the control unit is further configured to:

determine second information in dependence upon the first information, wherein the second information is representative of whether the geometrical change exceeds a threshold, and, when the threshold is exceeded, then generate an output signal indicative of at least one of an anomaly present in the bearing and a propagation of the anomaly in the bearing.

* * * * *